US010887384B2

(12) United States Patent
Osborne et al.

(10) Patent No.: US 10,887,384 B2
(45) Date of Patent: Jan. 5, 2021

(54) DIGITAL COLLABORATION SYSTEM (71) Applicant: Accenture Global Services Limited, Dublin (IE)

(72) Inventors: Kirsty Osborne, London (GB); Benjamin M. Foulkes, London (GB); Loren Naish, London (GB)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 798 days.

(21) Appl. No.: 14/668,038

(22) Filed: Mar. 25, 2015

(65) Prior Publication Data

US 2016/0285967 A1  Sep. 29, 2016

(51) Int. Cl.
*H04L 29/08* (2006.01)
*H04L 12/18* (2006.01)
*H04L 12/58* (2006.01)

(52) U.S. Cl.
CPC ...... *H04L 67/1091* (2013.01); *H04L 12/1822* (2013.01); *H04L 67/141* (2013.01); *H04L 51/32* (2013.01)

(58) Field of Classification Search
CPC ............... H04L 67/1091; H04L 67/141; H04L 12/1822; H04L 51/32
USPC ......................................................... 709/206
See application file for complete search history.

(56) References Cited

U.S. PATENT DOCUMENTS

| | | | | |
|---|---|---|---|---|
| 6,501,463 | B1* | 12/2002 | Dahley | G01L 1/205 345/156 |
| 7,966,370 | B1* | 6/2011 | Pegg | G06Q 10/10 709/204 |
| 2003/0149681 | A1* | 8/2003 | Frees | G06Q 10/10 |
| 2003/0182168 | A1* | 9/2003 | Lyons | G06Q 10/10 705/7.11 |
| 2006/0190319 | A1* | 8/2006 | Hanswadkar | G06Q 30/02 705/7.32 |
| 2009/0234721 | A1* | 9/2009 | Bigelow | G06Q 10/10 705/12 |
| 2009/0240771 | A1* | 9/2009 | Capobianco | G06Q 30/02 709/204 |
| 2009/0309846 | A1* | 12/2009 | Trachtenberg | G06F 3/017 345/173 |
| 2010/0279266 | A1* | 11/2010 | Laine | G06Q 10/10 434/350 |
| 2011/0184954 | A1* | 7/2011 | Nelson | G06F 17/30722 707/740 |
| 2011/0319173 | A1* | 12/2011 | Backer | A63F 13/12 463/42 |

(Continued)

*Primary Examiner* — Tonia L Dollinger
*Assistant Examiner* — Schquita D Goodwin
(74) *Attorney, Agent, or Firm* — Mannava & Kang, P.C.

(57) ABSTRACT

A digital collaboration system includes a collaboration application running on client devices and a group device that communicates with a backend content management system (CMS) to provide a collaboration environment. In an initial stage, the collaboration application displays content provided by the CMS for review and generation of user feedback. The CMS utilizes the user feedback to filter the content for a subsequent stage of evaluation of the filtered content. The filtered content may be displayed on a collaboration board generated in a graphic user interface on the group device. Additional feedback on the filtered content is captured through the collaboration board and stored in the CMS for subsequent analysis and reporting.

20 Claims, 10 Drawing Sheets

(56) References Cited

U.S. PATENT DOCUMENTS

| | | | |
|---|---|---|---|
| 2012/0072392 A1* | 3/2012 | Crowhurst | G06Q 10/10 707/608 |
| 2012/0124484 A1* | 5/2012 | Robinson | G06Q 10/00 715/753 |
| 2012/0297313 A1* | 11/2012 | Sharma | G06Q 10/10 715/751 |
| 2013/0022955 A1 | 1/2013 | Lang et al. | |
| 2013/0073344 A1* | 3/2013 | Parent | G06Q 10/06 705/7.39 |
| 2013/0238724 A1* | 9/2013 | Cunningham | H04L 51/24 709/206 |
| 2013/0309648 A1* | 11/2013 | Park | G09B 5/00 434/350 |
| 2014/0074824 A1* | 3/2014 | Rad | G06Q 50/01 707/722 |
| 2014/0117073 A1* | 5/2014 | Bell | H04L 12/1818 235/375 |
| 2014/0149880 A1 | 5/2014 | Farouki | |
| 2014/0210734 A1* | 7/2014 | Windbrake | H04L 65/403 345/173 |
| 2014/0244568 A1* | 8/2014 | Goel | H04W 4/005 706/52 |
| 2014/0244720 A1* | 8/2014 | Knodt | G06F 3/048 709/203 |
| 2014/0250398 A1* | 9/2014 | Andrews | G06F 3/0481 715/771 |
| 2015/0073959 A1* | 3/2015 | Connors | G06Q 40/00 705/35 |
| 2015/0134737 A1* | 5/2015 | Albrecht | H04L 12/1822 709/204 |
| 2015/0288913 A1* | 10/2015 | Maruyama | H04L 65/4015 348/445 |
| 2015/0332037 A1* | 11/2015 | Tse | G06F 21/36 726/19 |
| 2016/0127292 A1* | 5/2016 | Birger | H04L 51/16 709/206 |
| 2016/0154570 A1* | 6/2016 | Rosenberg | E21B 47/122 715/753 |

* cited by examiner

Case Studies

Filter by name 🔍

Filter by category 🔍

| View all case studies | Create a case studies | View all events | Create an event | Logout |
|---|---|---|---|---|
| ☐ Select all | Delete case studies | Edit case studies | Add to new event | Add to event |

| | | |
|---|---|---|
| ☐ Alpha | Alpha, Beta, Charlie | View |
| △ Cyborg | New Tech, Google Glass, Android | View |
| ☐ Echo | Echo, Foxtrot, Golf | View |
| △ Google Glass | | View |
| ☐ Hotel | Hotel, India, Juliet | View |
| △ Lego | | View |
| △ Lego Legend | Toys | View |
| ☐ New Case Study | | View |

FIG. 4

| Case Studies | View all case studies | Create a case studies | View all events | Create an event | Logout |

Fields with a red asterix * must be completed in order to save

Time of study *

New case study

Image for case study *

Screen Shot 2015-01-05 at 13 14 (:  [Browse]

Images must be:
- Included (a file upload is mandatory)
- A JPG or PNG file
- At least 400x280 pixels
- Image dimensions close to the ratio 1.4.1

Description of case study

Details of case study. What has been done? Why is it innovative? What is the impact?

366 characters remaining

Source of case study www.dssydsoweu.co.uk

FIG. 5

Create Event

View all case studies | Create a case studies | View all events | Create an event | Logout Fields with a red asterix * must be completed in order to save Client Name *: Test Date of event *: 07/01/2015

Event start time *: 01 : 05

Event end time *: 03 : 20

Number of participants *: 4

Number of groups *: 2

Client service groups *:
- ☐ CMT
- ☑ Digital
- ☐ FS
- ☐ H&PS
- ☐ Operations
- ☑ Products
- ☐ Resources
- ☐ Strategy
- ☐ Technology Add additional client service gropus      Add Save

FIG. 6

View Event | View all use cases | Create a use case | View all events | Create an event | Logout test Edit this event Date: 07/01/2015, from 01:05 to 03:20
Participants: 4 participants across 2 groups
Client service groups:
Digital
Products

Status

This event is currently inactive.
While inactive, an event can be edited and have use cases associated with it. More controls are available on the View all events page.

Active event

Use Cases
All use cases
Showing at 25

Sample Usecase 1
Sample Usecase 2
Sample Usecase 3
Sample Usecase 4
Sample Usecase 5
Sample Usecase 6
Sample Usecase 7
Sample Usecase 8
Sample Usecase 9
Sample Usecase 10
Sample Usecase 11
Sample Usecase 12
Sample Usecase 13
Sample Usecase 14
Sample Usecase 15

Use cases assigned to this event
Showing at 1

Test

DIGITAL COLLABORATION SYSTEM

BACKGROUND

It is common in working environments for individuals to work together to achieve a common goal. In many instances, this is achieved largely through a manual process. For example, for a brainstorming session, individuals may meet in a conference room, and discuss and summarize ideas on a whiteboard. There may be some technology involved to aid in the collaborative process. For example, an electronic whiteboard may print information written on the whiteboard, or information determined during the collaborative process may be summarized in an electronic document and exchanged via email or stored on a shared drive for access by the relevant individuals. However, most of the technological tools used may not be specifically designed for the collaborative process and can be inefficient or inoperative for a real-time collaborative environment.

BRIEF DESCRIPTION OF DRAWINGS

Features of the present disclosure are illustrated by way of examples shown in the following figures. In the following figures, like numerals indicate like elements, in which.

DETAILED DESCRIPTION

For simplicity and illustrative purposes, the present disclosure is described by referring mainly to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to embodiments described herein, a digital collaboration system facilitates delivery, review and feedback generation in real-time of case studies that are made available via a backend content management system (CMS) to multiple client devices. A collaboration application may be executed on each of the client devices which allows users to quickly review and provide feedback on the case studies. The collaboration application allows swipe-based feedback generation of case studies to streamline user review and feedback.

Through feedback-based filtering, the digital collaboration system filters and selects candidate case studies and can present the candidate case studies for further discussion on a group device. The group device provides a graphical user interface (GUI) which allows users to view candidate case study summaries, categorize candidate case studies through drag-and-drop functionality, and create digital sticky-note labels to annotate the candidate case studies.

A technical problem of existing technology is the difficulty in collecting user-generated content from different users and devices and analyzing the collected user-generated content in real-time and automatically arranging the user-generated content to facilitate interaction with the collected and analyzed content. Typically, in a collaborative environment, technology, such as email, shared drives, etc., is used to collect and share information, but the technology is not designed for real-time collection, analysis and arrangement of user-generated content, especially for multi-stage collaboration. The digital collaboration system, according to an embodiment, provides an electronic, real-time, collaborative environment that allows multi-stage, collaborative-based decision making and content management, which streamlines the collaborative process. The digital collaboration system employs user interfaces designed to quickly and efficiently capture user-generated content and feedback of content, and presents information in a manner that facilitates collaboration.

The digital collaboration system is described below referring, by way of example, to evaluation of case studies in a collaborative environment. A case study comprises digital content. Case studies for example include content comprising a description of a particular subject. The case studies are provided in digital form, such as electronic documents, video, digital pictures, combination thereof, and stored in the CMS. The digital collaboration system can process and manage content, other than case studies, for a collaboration environment. Content for example is digital content such as electronic documents, video, digital pictures, combination thereof. A content item may be one or multiple digital content items, such as a digital picture or multiple digital pictures.

Figure 1:
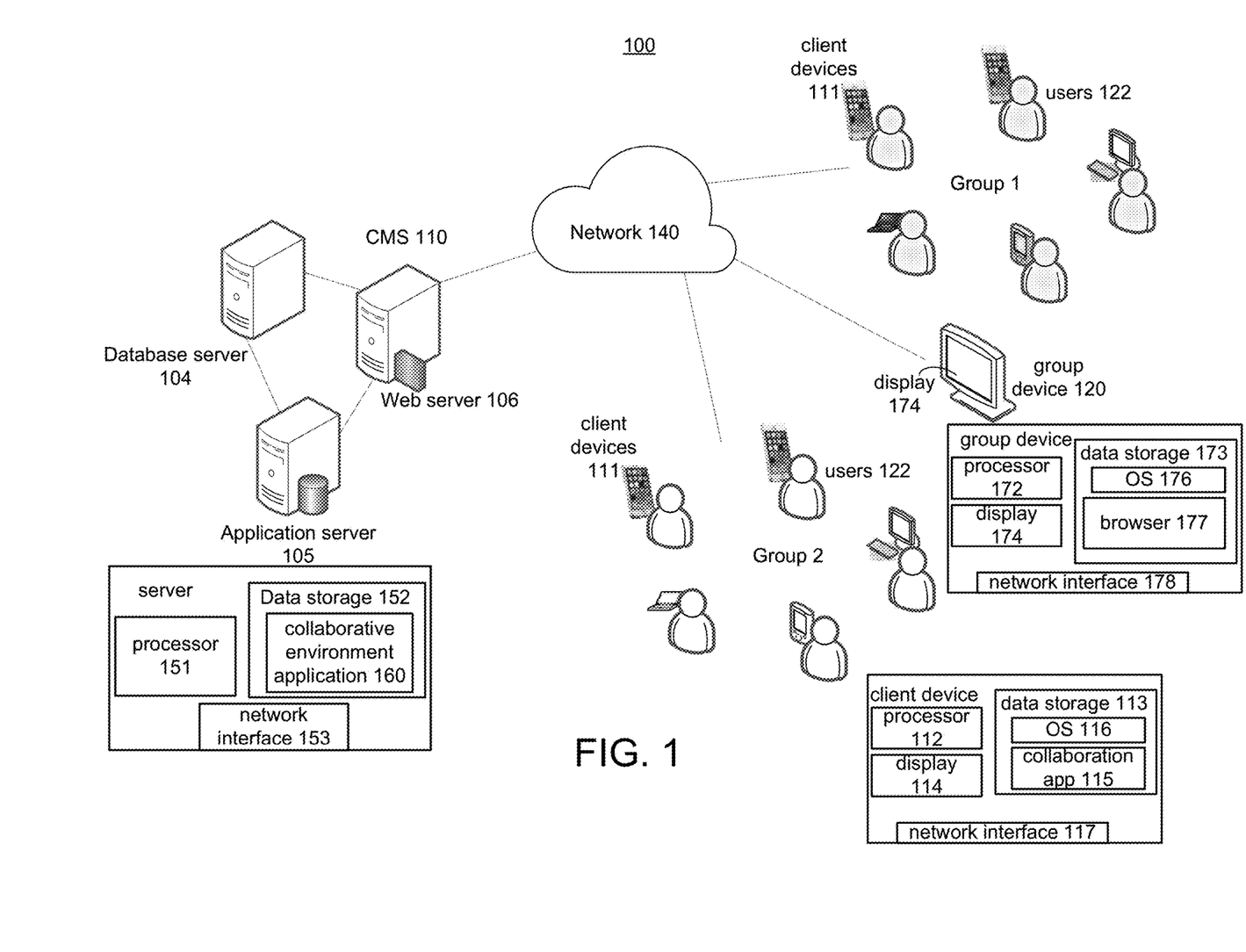
FIG. 1 illustrates a digital collaboration system according to an embodiment.

FIG. 1 illustrates digital collaboration system 100, according to an embodiment. The system 100 includes CMS 110 connected to client devices 111 and group device 120 via network 140. The client devices 111 may include laptops, desktops, tablets, cellular phones, or other types of computers. An example of components that may be provided in any of the client devices 111 is shown. For example, each of the client devices 111 may include a processor 112, data storage 113, a display 114 and a network interface 117. A client device may have an operating system (OS) 116 and host applications, including a collaboration application 115. The client devices 111 may each include an input/output (I/O) device to accept user input. The display 114 may be a touchscreen display that is an I/O device that accepts user input.

The collaboration application 115 receives content, such as case studies, from the CMS 110 and displays the case studies for review and feedback via the display 114. The feedback is collected and stored and analyzed by the CMS 110, as is further described below. The feedback may include selecting or not selecting case studies for further review by the users 122. The collaboration application 115 may allow a user to select or not select a case study for further review by swiping a displayed case study to the left or right on the display 114. For example, a swipe to the left indicates the case study is not selected. A swipe to the right indicates the case study is selected. The CMS 110 stores the selections made through the collaboration application 115 on the client devices 111, for example, during a content selection stage of the collaborative process. In the content selection stage, the users 122 may be divided into groups, such as groups 1 and 2 shown in FIG. 1. Each member of the group may review a portion of the case studies to minimize review time. In a subsequent stage of the collaborative process, referred to as a group analysis stage, the selected case studies, also referred to as candidate case studies, are presented by the CMS 110 for further review via the group device 120. In this stage, all the users 122 may participate collectively to collaborate on the selected case studies. In the group analysis stage, the CMS system 110 selects and arranges content for display simultaneously to all the groups of users, such as via the group device 120. The "liked" content may be displayed on the group device 120 and may be annotated and analyzed.

The group device 120 may also be a laptop, desktop, tablet, cellular phone, or another type of computer. The group device 120 may include a larger display 174 than the displays of the client devices 111 or connect to a larger display that is viewable by all users 122. The CMS 110 may present the selected case studies for further review on the group device 120. Components of the group device 120 are shown. The components may include processor 172, data storage 173, display 174 and network interface 178. The data storage 173 may store machine readable instructions for OS 176 and browser 177. In an example, the CMS 110 may generate a graphical user interface via the browser 177 on the display 174. The graphical user interface may include a collaboration board that shows all or a portion of the selected case studies. The collaboration board may have a background that can be re-skinned as desired by a user. The users 122 may interact with the collaboration board. The case studies may be categorized by the users and subdivisions may be created on the collaboration board to include the case studies by category. Also, case studies may be annotated on the collaboration board. The categories and annotations are stored by the CMS 110. Although the group device 120 is shown as a separate device from the client devices 111, the group device 120 may be one of the client devices 111 or may be multiple ones of the client devices 111. For example, the collaboration board may be displayed via a browser on one or multiple of the client devices 111. Also, the collaboration board is described as a GUI generated in a browser for example by the collaborative environment application 160 hosted and executed by the application server 105. In another embodiment, the collaboration board may be generated by an application running on a client device that is in communication with the application server 105.

The CMS 110 may include one or more servers that interact with the client devices 111 and the group device 120 over network 140 which may include one or more networks. In an example, the network 140 includes the Internet and/or a local area network. The CMS 110 may include multiple servers. For example, the CMS 110 may include a database server 104 to store content, including case studies, an application server 105 that hosts a collaborative environment application 160, and a web server 106 for the CMS 110 to interact with the client devices 111 and the group device 120 over the Internet.

An example of hardware that may be used for any of the servers is shown as 150, which includes a processor 151, data storage 152 and network interface 153. The processor 151 is an integrated circuit, such as a central processing unit. The data storage 152 includes volatile and/or nonvolatile data storage that can store data and software or firmware including machine readable instructions. The software or firmware may include subroutines or applications that perform the functions of the server and/or runs applications. The server also includes a network interface 153 to communicate with other servers and/or devices via the network 140. For the application server 105, the data storage 152 may store the collaborative environment application 160 which is executed by the processor 151 to perform functions of the CMS 110, including but not limited to managing the case studies, creating events, communicating with the collaboration applications on the client devices 111 to distribute case studies and collect user feedback, generating the collaboration board on the group device 120, collecting feedback via the collaboration board, performing analytics on the feedback and historic data to detect patterns and make predictions, and generating reports on the events.

Figure 2:
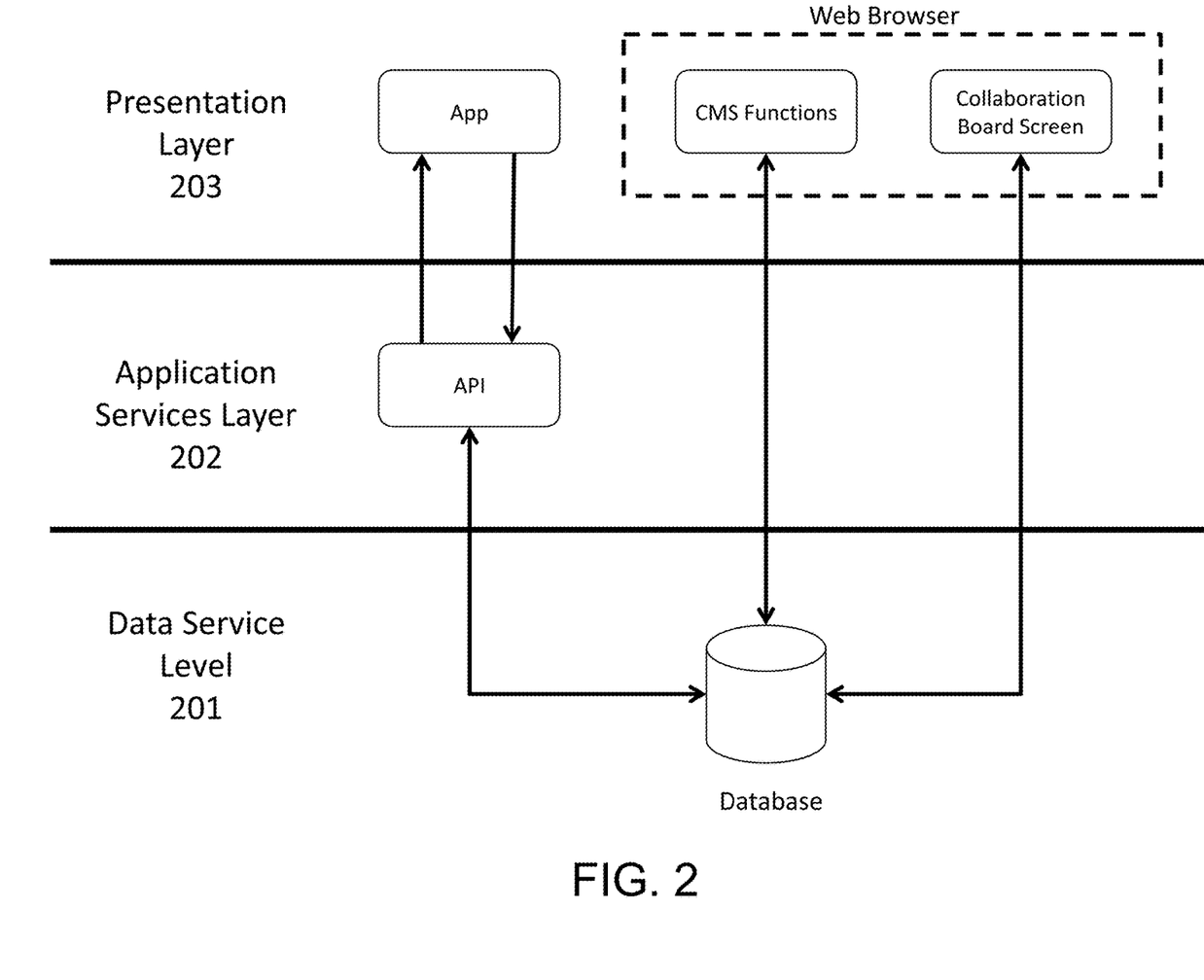
FIG. 2 illustrates an architecture of the digital collaboration system, according to an embodiment.

FIG. 2 shows an architecture of the system 100, according to an embodiment. The architecture may include a data service layer 201, an application services layer 202 and a presentation layer 203. The data service layer 201 may be provided by the database server 104 shown in FIG. 1 and include a database to store content (e.g., case studies), user feedback, or any information used by the system 100. The application services layer 202 may include the application server 105 shown in FIG. 1 and an application program interfaces (APIs) to interface with the database and the presentation layer 203. The presentation layer 203 displays content, such as case studies, and other information, and accepts user feedback. The presentation layer 203 may include applications on the client devices 111, such as the collaboration application 115, and may include a GUI generated by the CMS 110 and displayed via a browser, such as the browser 177 of the group device 120. The GUI may display the collaboration board and may provide screens for performing other CMS functions, such as creating events, creating reports, etc.

Figure 3:
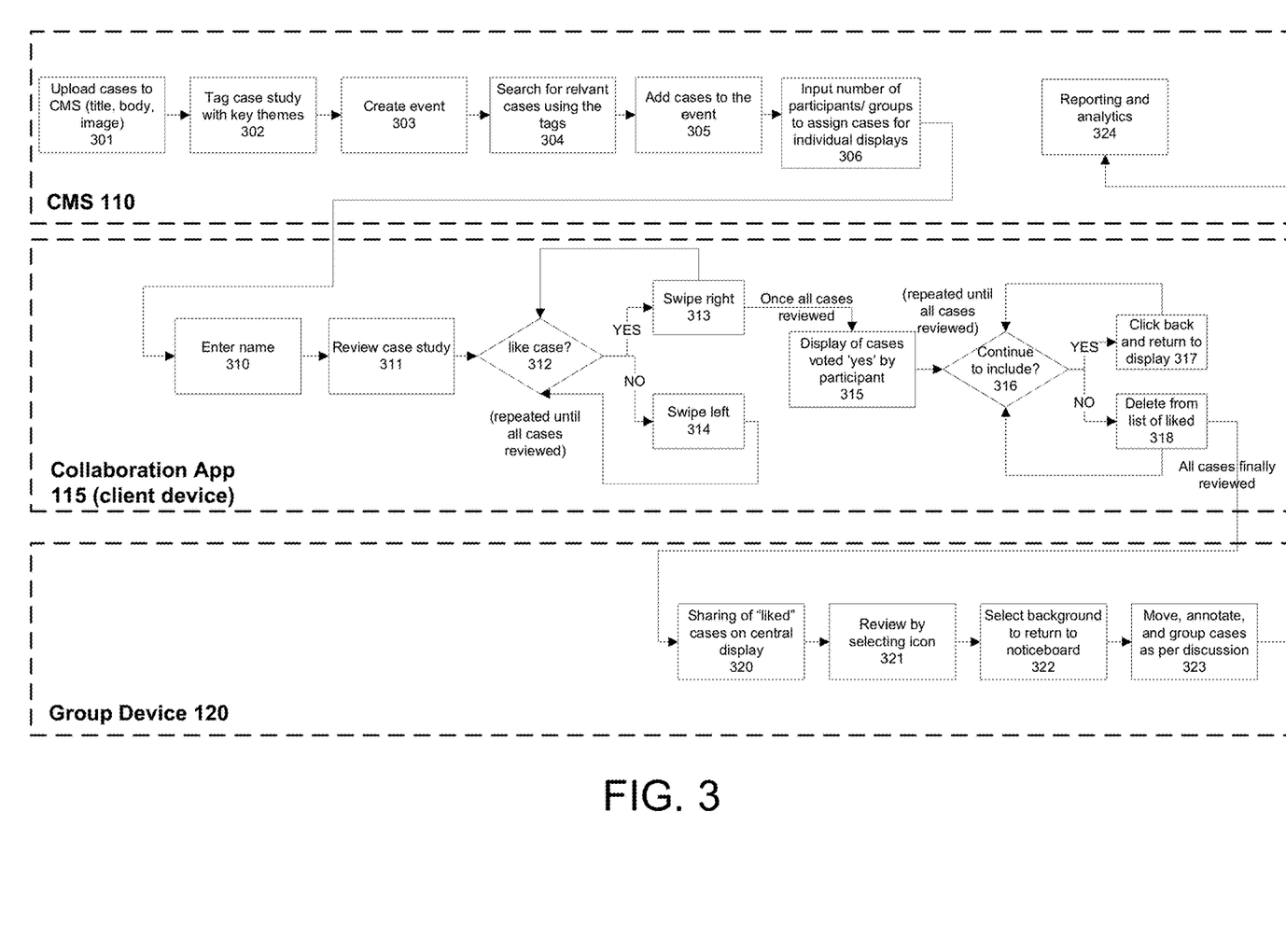
FIG. 3 illustrates flow charts of methods which may be performed by the digital collaboration system, according to embodiments.

FIG. 3 shows methods which are described by way of example as being performed by the CMS 110, the collaboration application 115 and the group device 120 shown in FIG. 1. The steps may be performed by the system 100 or other systems.

Steps 301-306 and 324 may be performed by the CMS 110. At 301, content, such as case studies, are loaded into the CMS 110. A user may upload the content. For example, each case study may include a title, a body of text, images, video, or other forms of content that are stored in the CMS 110. The application server 105 may generate a GUI for uploading case studies, and the case studies are stored in the database server 104. New case studies may be uploaded at any time and may be revised at any time if not currently be used for an event. At 302, case studies uploaded to the CMS 110 may be tagged with a key theme or some other category. The themes or categories may be created and stored, and the case studies may be tagged with one more themes or categories. Tagging may include storing an indication of the tag applied to the case study. A field may be provided for each type of tag in the database server 104.

At 303, an event, also referred to as a collaboration event, is created. During the collaboration event, users collaborate on content via the system 100. At 304-306, the CMS 110 receives information for the event. For example, at 304 and 305, a set of case studies is added to the event. For example, the case studies stored in the database server 104 may be searched according to their tags to identify case studies relevant to a theme of the event. In one example, the event is for a workshop to evaluate case studies related to innovations for a particular theme. The database server 104 is searched to identify a set of case studies related to the theme, and the set of case studies are added to the event. At 306, the CMS 110 receives number of participants (i.e., number of users 122) for the event, and number of groups of participants and the number of participants to assign to each group. During the content selection stage, as described in further detail below, the entire set of case studies may be distributed to each group, but each member of each group may review only a portion of the set of case studies. However, all the case studies are reviewed by each group. For example, if the set of case studies is 100 case studies, and there are 5 participants in the group, each participant reviews 20 different case studies from the set, so all the case studies in the set are reviewed. The application server 105 may assign case studies to each participant for review. Information for the collaboration event determined at steps 304-306 is stored in the database server 104 and used by the application server 105 to manage the event.

Steps 310-318 may be executed during the content selection stage, and the steps may be performed by or in conjunction with the collaboration application 115 which is executed by each of the client devices 111. The steps 310-318 may be performed for each participant in the collaboration event to review their assigned case studies so all the case studies in the case study set are reviewed, and feedback is provided for each case study. As indicated above, all the case studies may be reviewed by each group of participants.

At 310, each of the participants enters a user identifier (ID), which may be there name, login ID, etc. For example, the collaboration application 115 displays a screen for the participant to enter their ID. A password may also be entered to login. The user ID is sent to the CMS 110, and the CMS 110 sends the case studies which are assigned to the participant to the client device and the collaboration application 115 on the client device. At 311, the collaboration application 315 starts displaying the case studies. For example, a case study assigned to the participant is displayed for review, and at 312-314, the participant provides user input to indicate whether the case study is selected or not selected. For example, if the participant likes the displayed case study, the participant swipes right at 313, and the collaboration application 115 stores an indication the case study is selected or "liked". If the participant does not like the displayed case study, the participant swipes left at 314, and the collaboration application 115 stores an indication that the case study is not selected or "disliked". This process is repeated for each case study assigned to the participant.

Whether a participant likes or dislikes a case study may be based on an objective of the collaboration event. In an example, the event may be associated with a work shop to evaluate innovations that may be relevant to particular organization or company that is participating in the collaboration event. Each of the case studies represents a particular innovation, and may include a title describing the innovation, a description of the innovation in the body of the case study, and an image or video showing the innovation. The event may be themed, such as customer service for online shopping, and case studies are identified for the theme. The participants may "like" case studies that they believe are interesting, and that are most relevant to the theme, and that may be most beneficial to the company or organization.

During the content selection stage, the participants are meant to be exposed to a large case study set, which is filtered during the content selection stage based on the participants' selections. The collaboration application 115 may allow a participant a predetermined amount of time to review each case study, and the case studies may be designed to each be reviewed in a short time period. At the end of the predetermined amount of time, the participant may be required to make a selection, such as swipe left or swipe right. The collaboration application 115 may grey the text in the body or provide some other indication that the selection must be made. The timer may be used to minimize or regulate the amount of time it takes to complete the content selection stage.

At 315, after a selection has been made for each assigned case study, the collaboration application 115 may display a list of the case studies and an indication of which cases were "liked" or "disliked". At 316-318, the participant is given an opportunity to review and change their previous input on a case study, such as whether the case study is "liked" or "disliked". At 316, the participant may select whether to continue to include a case study as "liked". If yes, at 317, the user may be returned to the list displayed at 315. If no, at 318, the case study may be deleted from the list or changed to "disliked". A time limit may be imposed for these steps. Once all the cases are finally reviewed and final selections are made, the participant's selections, e.g., their "likes" and "dislikes" are sent from the collaboration application 115 to the CMS 110. The CMS 110 stores the selections for all the participants. All the "liked" case studies may be selected for further discussion and analysis during the group analysis stage.

Steps 320-323 may be performed during the group analysis stage of the collaboration event. The steps 320-323 may be performed by the group device 120 or in conjunction with the group device 120 and the CMS 110. At step 320, the "liked" cases may be displayed on the group device 120. These may include all the "liked" cases of all the participants, which represents a filtered set of the case studies. Participant feedback is collected during this stage and stored in the CMS 110. For example, a GUI including a collaboration board is displayed by the group device 120. The GUI may be generated by the application server 105 and presented via the browser 177 of the group device 120. The collaboration board may include smaller versions or thumbnails of the "liked" case studies so all or a majority of the "liked" case studies may be displayed on a single screen. At 321, an icon of a case study displayed on the group device 120 may be selected to display the case study, and at 322, the background may be selected to return to the screen displaying all the "liked" case studies. At 323, the displayed case studies may be annotated by the participants, categorized by the participants, and arranged on the display according to categories generated by the participants. The annotations and categories are entered via the group device 120 and received by the applications server 105 and stored in the database server 104. Also, the annotations may be displayed on the group device 120. Also, the display may be subdivided such that each subdivision represents a category, and the case studies may be dragged and dropped into the corresponding subdivision. This aids in the collaboration process happening in this stage between the participants. Step 323 may be happening simultaneously with steps 320-322. During this stage, the participants are discussing the "liked" case studies and may be further prioritizing or filtering the "liked" case studies based on their discussion. Annotations about what was liked or disliked about a case study or any other annotations may be made via the collaboration board and stored in the CMS 110.

At 324, collected information, including participant feedback, is analyzed and reports are generated by the CMS 110.

The reports may be based on report templates, and may include the list of "liked" case studies and "disliked" case studies, the participants and their selection of "like" or "dislike" and any feedback generated during the group analysis stage. The reports may be provided to participants or another person electronically, such as via email.

Also, at 324, the CMS 110 may perform analytics on the collected data. The analytics may identify patterns based on the feedback stored for multiple events in the data storage 104. The patterns may identify patterns in industry or cross-industry, and may provide insight as to why particular case studies are "liked" or "disliked".

FIGS. 4-7 show examples of screenshots of GUIs that may be generated by the CMS 110. For example, the collaboration environment application 160 executed by the application server 104 may generate these screens in a device, such as the group device 120 or another device, for example, via a browser. These screens may be used to manage case studies and events.

Figure 4:
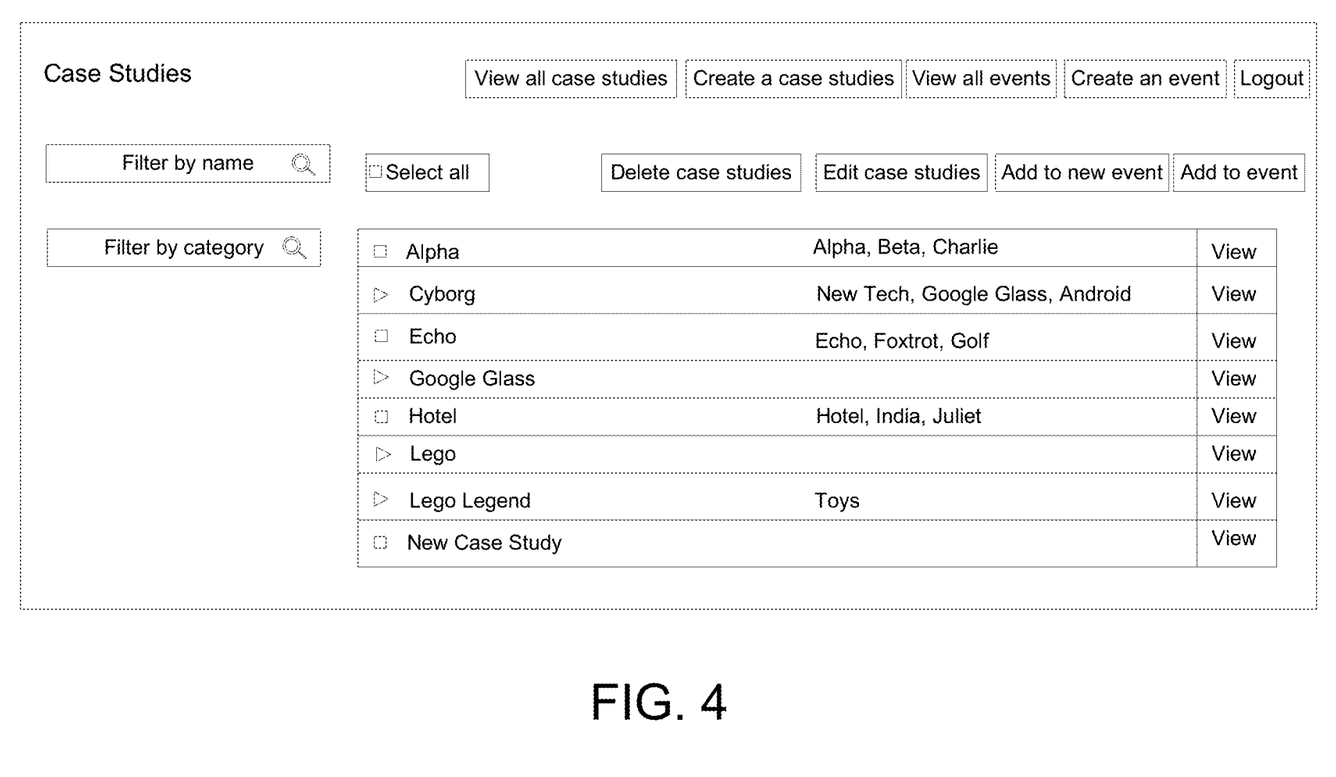
FIGS. 4-7 illustrate examples of screenshots that may be generated by a content management system, according to embodiments.

FIG. 4 shows an example of a screenshot for managing case studies and events. To reach this screen, the user must have successfully logged into the CMS 110. A user may view, create, delete or edit case studies by clicking on the corresponding button. A list of case studies are shown, and include a title and description and/or tags. Also, the case studies may be searched, for example, by name, category or another field and the search results would be displayed. From this screen, case studies may be selected for an event, such as shown. Also, events may be viewed and created.

Figure 5:
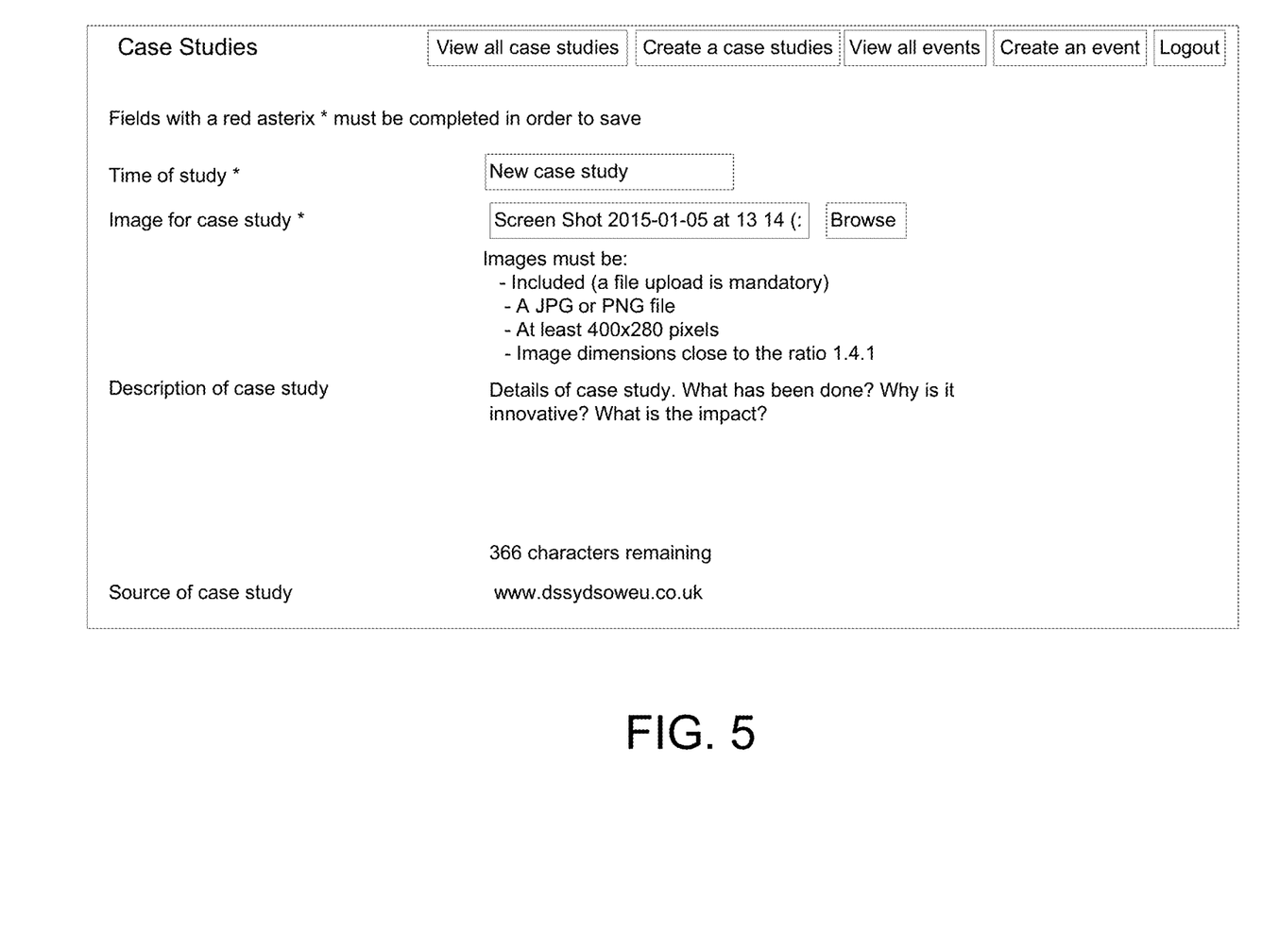

FIG. 5 shows an example of a screenshot for creating a case study. Information, such as title, description and source may be entered for the case study. Images may be entered. The information for the case study may be displayed on the client devices 111 or the group device 120 for the different stages of the collaborative process.

Figure 6:
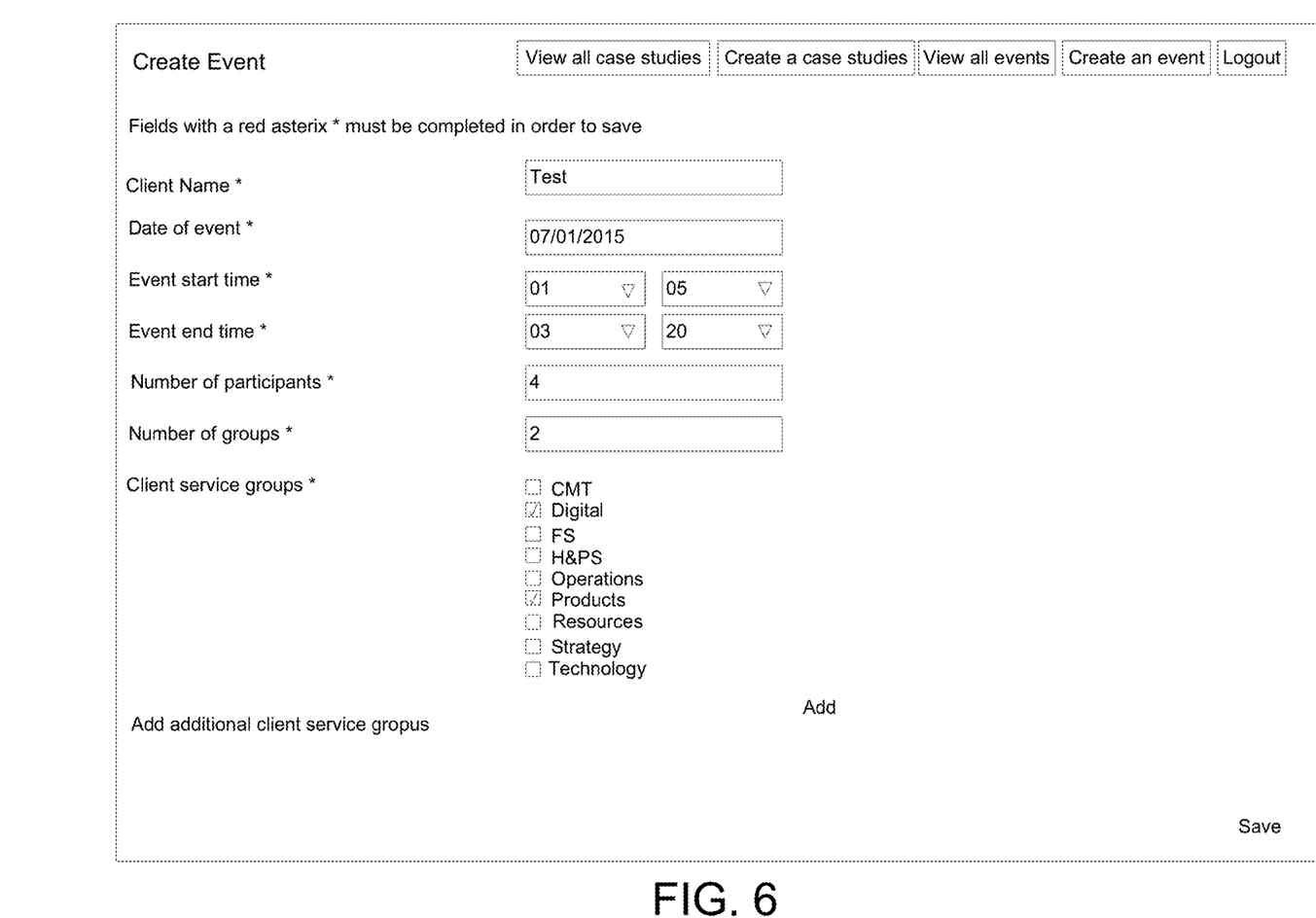
Figure 7:
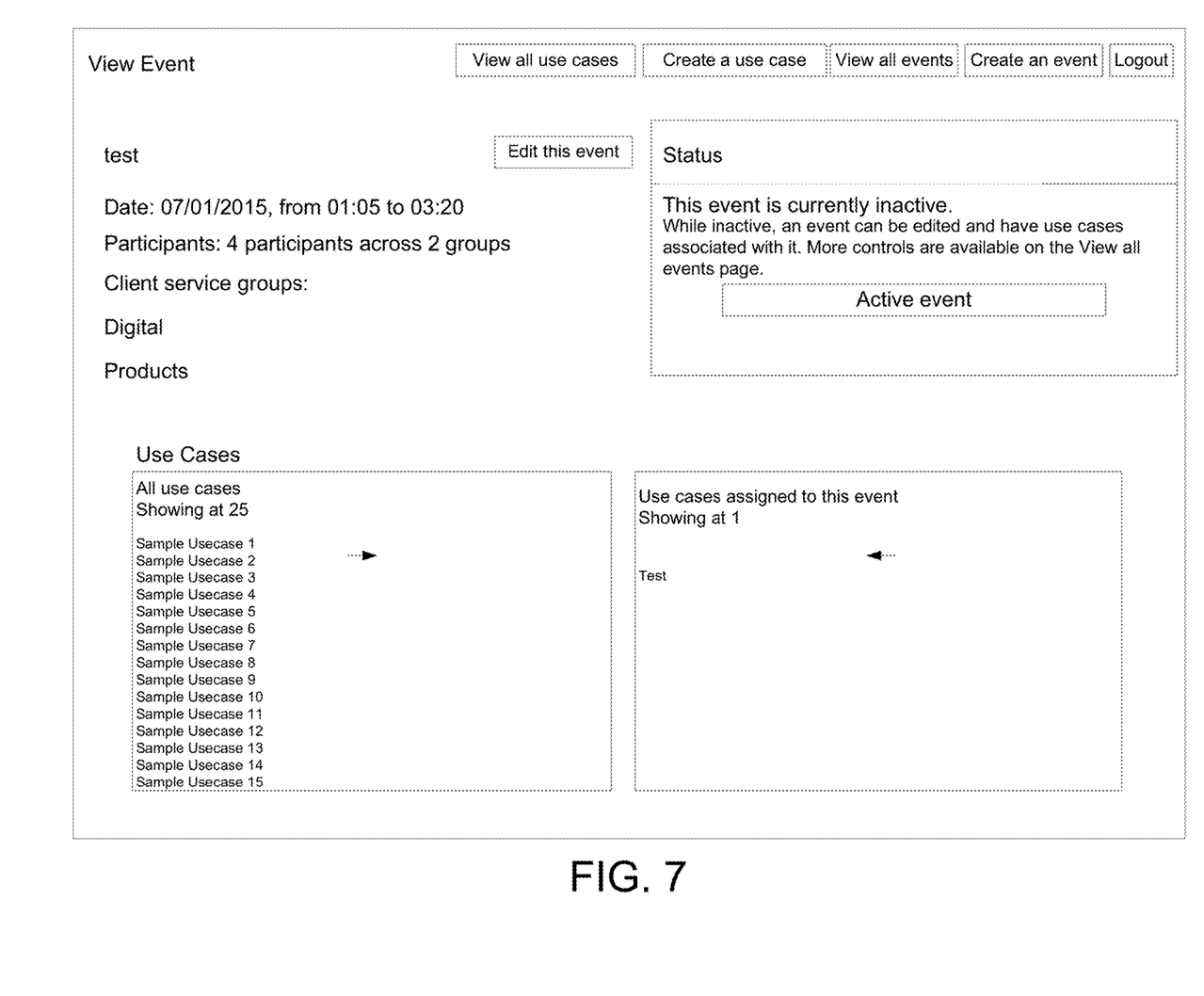

FIG. 6 shows an example of a screenshot for creating an event, and FIG. 7 shows an example of a screenshot for viewing an event. In FIG. 6, information, such as client name, date of event, start time, end time, number of participants, number of groups, and client service groups, may be entered for the event. The event may be viewed, such as shown in FIG. 7. An event may have three states: inactive, active, and complete. At the beginning, an event is inactive. This is when case studies can be added to the event. To change the event status you can click the activate event button in the status area.

Figure 8:
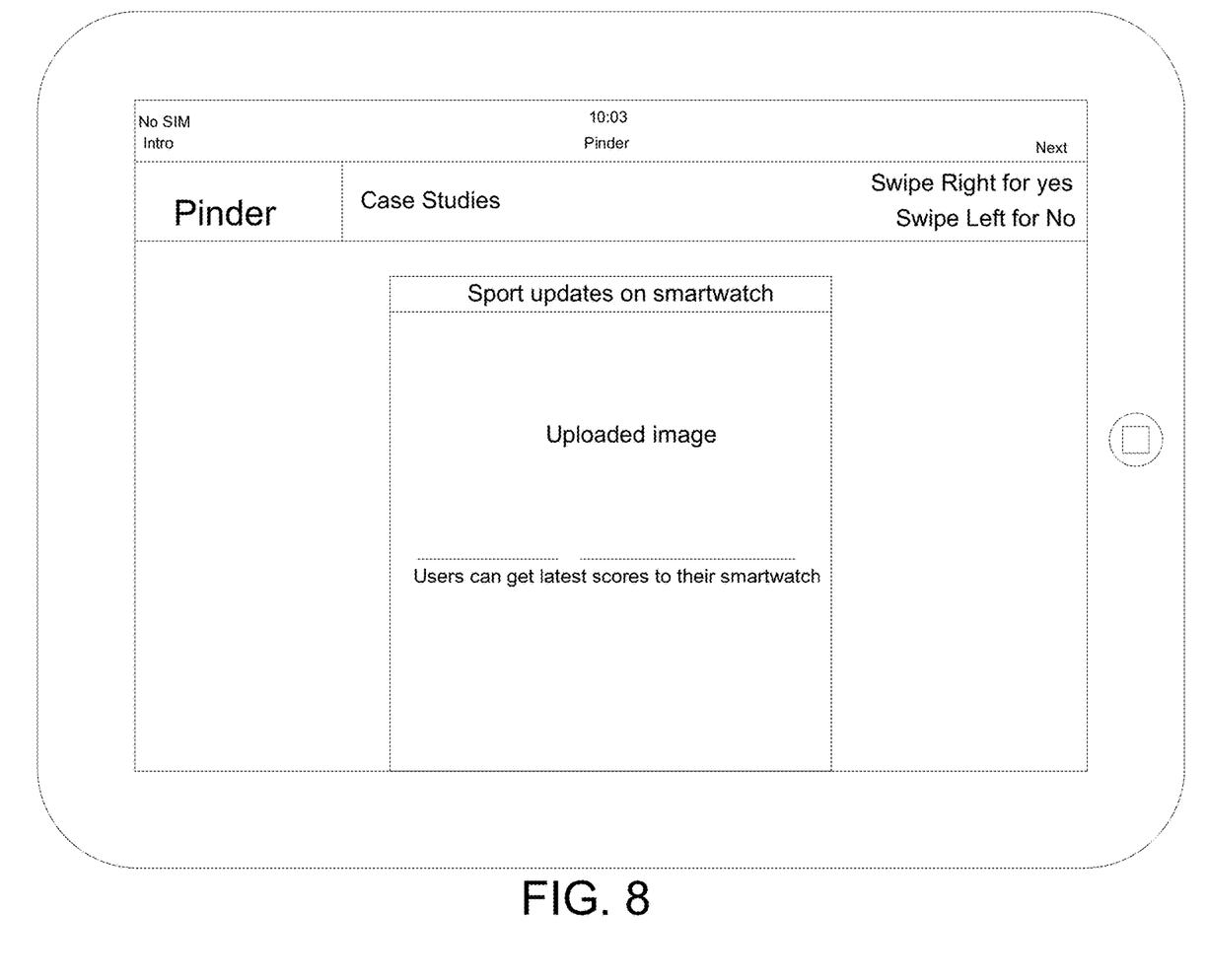
FIG. 8-9 illustrate examples of screenshots that may be generated by a collaboration application, according to embodiments.
Figure 9:
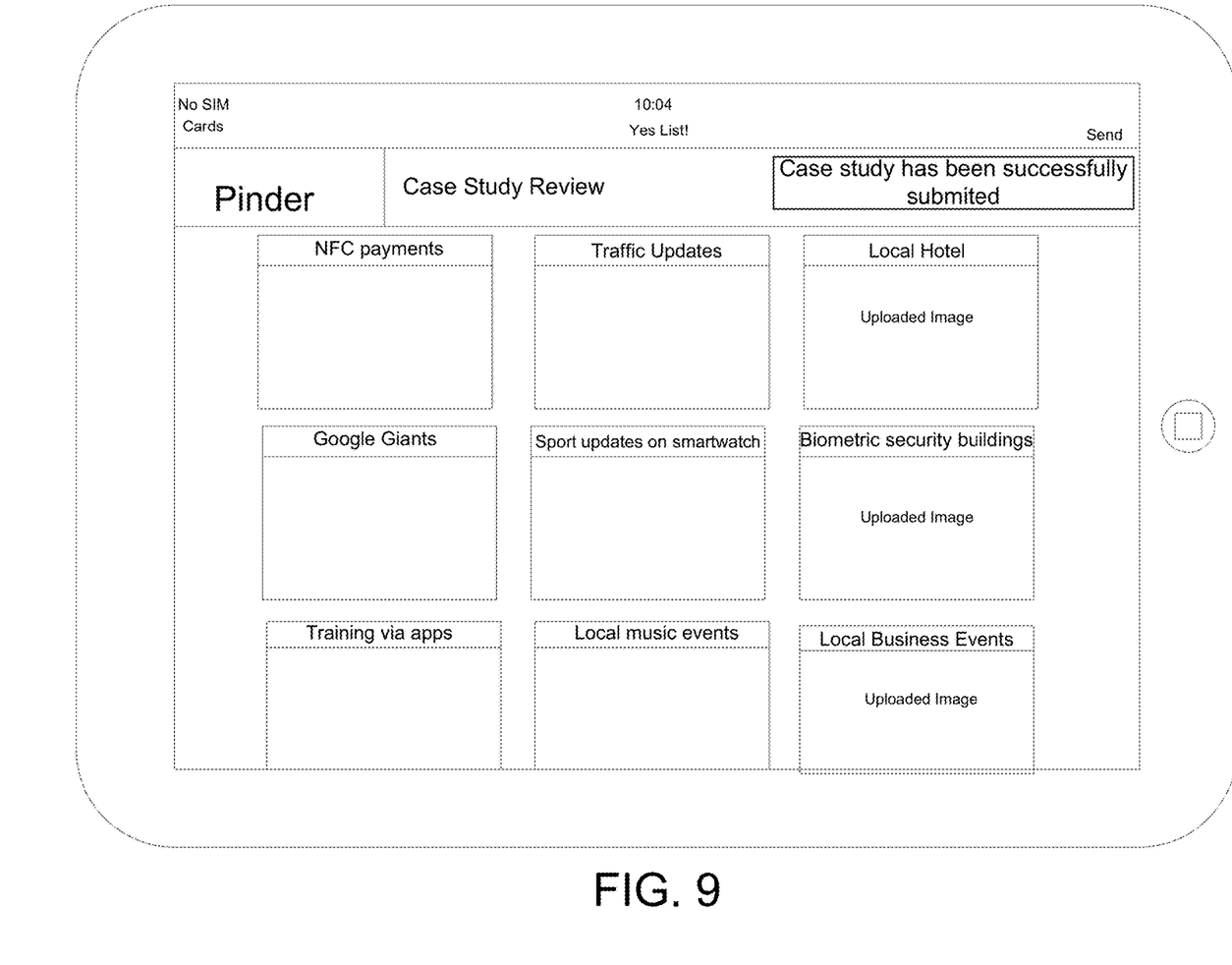

FIGS. 8 and 9 show examples of screenshots that may be generated by the collaboration application 115 on a client device, for example, during the content selection stage. FIG. 8 shows a case study that is displayed. The user may swipe the displayed case study to the right to "like" it, or may swipe the displayed case study to the left to "dislike" it. The displayed case study for example includes the title, the text in the body and the image. The image would be shown in place of "Uploaded Image". Once all cases have been reviewed, the participant is taken to a screen to review all their "liked" case studies, i.e. the ones they chose to take forward to the next stage. This is shown in FIG. 9, which may include thumb nails or smaller views of the "liked" case studies. The participant can expand the case studies to see full detail and remove them if they no longer consider them as interesting to share (i.e., changed to "dislike"). Once satisfied the participant clicks send, and their selections of "liked" and "disliked" are uploaded to the CMS 110.

Figure 10:
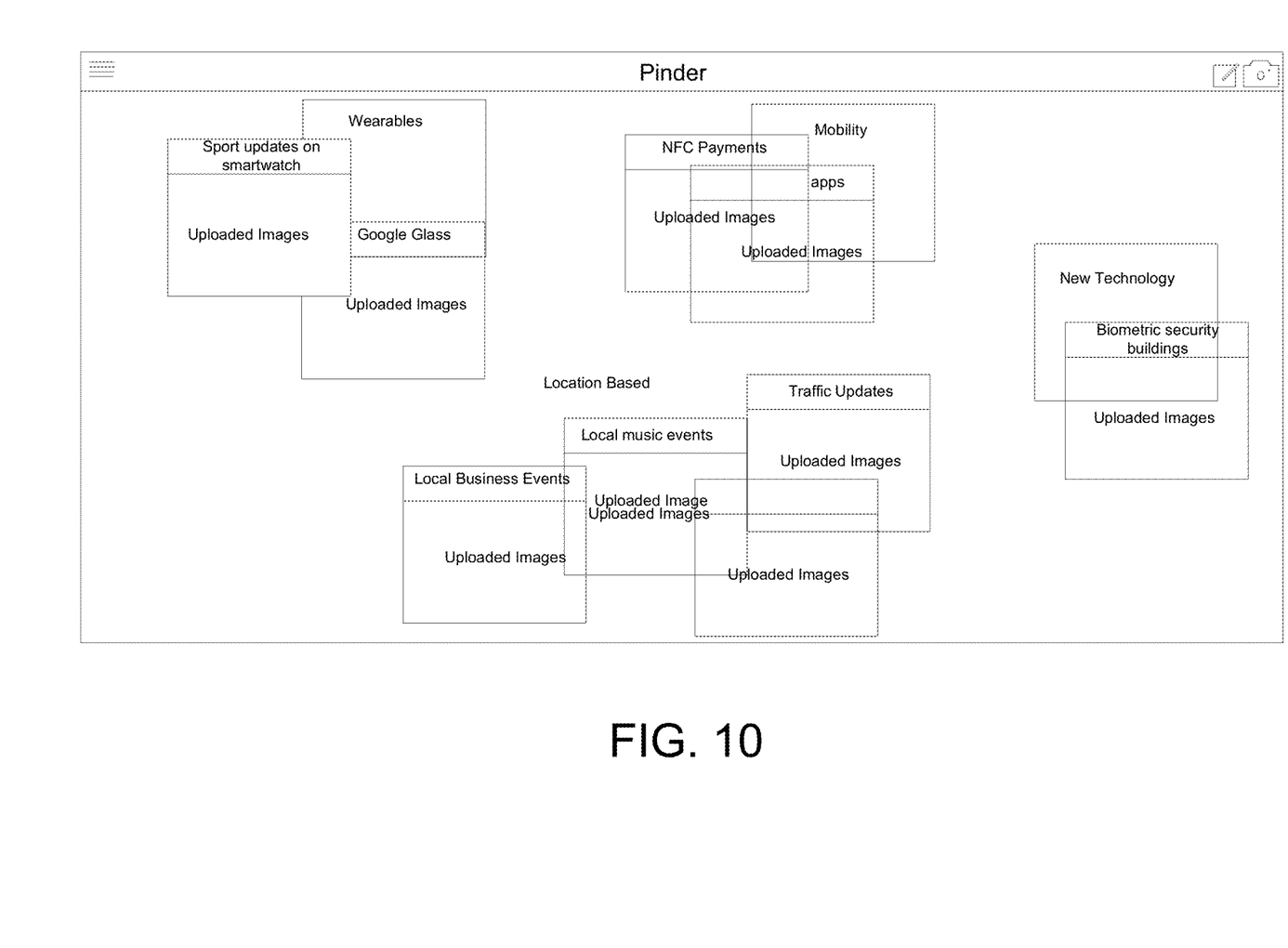
FIG. 10 illustrates an example of a screenshot of a collaboration board, according to an embodiment.

After all the case studies for the event are reviewed and the user selections are uploaded to the CMS 110, the CMS 110 generates the collaboration board on the group device 110 which includes the "liked" case studies. An example of screenshot including the collaboration board is shown in FIG. 10. The participants rejoin their subgroups in front of the group device 120 and discuss the displayed case studies with the rest of the group. The participants can drag and drop the case studies on the collaboration board into themes determined by the group. These themes can be labelled.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. A method of content management for a collaboration environment, the method comprising:

creating a collaboration event in an inactive state at an application server of a content management system receiving a query including at least one tag having information regarding the collaboration event, when the collaboration event is in the inactive state;

retrieving search results satisfying the query during the inactive state, the search results are retrieved from a database server that stores digital content wherein the search results include a set of digital content items;

adding the search results in the set of digital content items to the collaboration event in the inactive state;

performing analytics on user feedback associated with displayed digital content by one or more users in a plurality of user groups to identify a pattern associated with an industry related to the collaboration event;

providing an insight, based on the identified pattern, regarding a particular case study from the displayed digital content;

changing a status of the collaboration event from the inactive state to an active state to initiate a content selection stage upon either receiving an indication that an activate event button in a status area associated with the collaboration event has been clicked, or that the set of digital content should be associated with the collaboration event;

providing a plurality of client devices access to the set of digital content items, wherein each digital content item in the set of digital content is accessible by at least one of the plurality of client devices associated with at least one user in each of a plurality of groups and the plurality of client devices are connected to the content management system via a network;

determining, for each user in each of the plurality of user groups, a subset of the set of digital content items to display to the user via one of the client devices employed by the user, wherein each digital content item in the set of digital content items is displayed on at least one of the plurality of client devices associated with at least one user in the user groups;

during the content selection stage, displaying the set of digital content items across the plurality of client devices;

receiving user input of like or dislike for each digital content item in the set of digital content items at the plurality of client devices wherein swiping of the digital content item in one direction indicates user liking of the digital content item and selects the digital content item in the set of digital content items for display during a group analysis stage whereas swiping in an opposite direction indicates dislike and includes an indication that the digital content item is not selected for display during the group analysis stage;

sending the user input to the content management system;

during the group analysis stage, generating, by the application server, a collaboration board in a graphic user interface using a browser on a group device and at least one of the plurality of client devices, wherein the collaboration board displays liked digital content items;

receiving, on the collaboration board, user feedback on the liked digital content items;

enabling display of the user feedback on the liked digital content items on the collaboration board; and storing the user feedback on the liked digital content items in the content management system.

2. The method of claim 1, wherein creating the collaboration event at the application server comprises:

sending the query to a database server;

determining a number of users in the collaboration event;

determining a number of the plurality of user groups;

determining a number of the users in each of the plurality of user groups; and during the content selection stage, transmitting the corresponding subset of digital content items to the client devices used by the users via a network for review by the users.

3. The method of claim 1, comprising:

receiving user input at the application server to create the digital content items; and storing the set of digital content items in the database server of the content management system, wherein the each content item in the set of digital content items each include a title, a body of text and an image or video, and each content item in the set of digital content items is tagged with a theme.

4. A digital collaboration system facilitating a multi-stage collaborative event, the system comprising:

a content management system including:

an application server to:

create a collaboration event in an inactive state;

receive a query, including at least one tag associated with the collaboration event when the collaboration event is in the inactive state;

retrieve search results that include a set of digital content satisfying the query during the inactive state from a database server that stores the set of digital content;

add the search results in the set of digital content to the collaboration event in the inactive state;

perform analytics on user feedback associated with displayed digital content by one or more users in a plurality of user groups to identify a pattern associated with an industry related to the collaboration event;

provide an insight, based on the identified pattern, regarding a particular case study from the displayed digital content;

change a status of the collaboration event from the inactive state to an active state to initiate a content selection stage upon either receiving an indication that an activate event button in a status area associated with the collaboration event has been clicked, or that the set of digital content should be associated with the collaboration event; and provide a plurality of client devices access to the set of digital content, wherein each item in the set of digital content is accessible by at least one of the plurality of client devices associated with at least one user in each of the plurality of user groups, the plurality of client devices are employed by the at least one user in each of the plurality of user groups for reviewing the set of digital content and the plurality of client devices are connected to the content management system via a network; and a collaboration application executed by each of the plurality of client devices, at least one of the plurality of client devices includes a collaboration board within a browser, wherein, during the content selection stage of the collaboration event, each of the plurality of client devices receives a subset of the set of digital content, and the collaboration application executed by each of the plurality of client devices displays the subset of the digital content, receives user selections of the subset of the digital content, and transmits the user selections to the content management system, the user selections from the subset of the digital content displayed on a display of a client device are obtained via swipes of each of the subset of the digital content in a predetermined direction wherein swiping the digital content in one direction indicates liking and includes an indication of selection of the digital content for a group analysis stage and swiping the digital content in an opposite direction indicates dislike and stores an indication that the digital content is not selected for the group analysis stage of the collaboration event; and a graphical user interface displayed by a group device, and including the collaboration board within a browser, wherein the group device is connected to the content management system via the network, and during the group analysis stage of the collaboration event, the collaboration board displays the digital content, receives and displays the user feedback associated with the displayed digital content, receives user-supplied categories of the displayed digital content, and arranges the displayed digital content in the graphical user interface according to the categories, wherein the group device sends the user-supplied categories and the user feedback associated with the displayed digital content to the content management system, and the application server generates a report based on the user feedback associated with the displayed digital content.

5. The digital collaboration system of claim 4, wherein the application server:

determines a number of users in the collaboration event;

determines a number of the user groups;

determines a number of the users in each of the user groups;

determines, for each user in each user group, a corresponding subset of the set of digital content to display to the user via the collaboration application executed by one of the plurality of client devices used by the user; and during the content selection stage, sends the corresponding subset of digital content to the collaboration application via the network for review by the user.

6. The digital collaboration system of claim 5, wherein each item in the set of digital content is sent to at least one of the plurality of client devices.

7. The digital collaboration system of claim 6, wherein the client device displays the subset of the set of digital content via the collaboration application executed by the client device.

8. The digital collaboration system of claim 4, wherein, during the content selection stage of the collaboration event, the collaboration application executed by each of the plurality of client devices requires a user selection to be made within a predetermined amount of time.

9. The digital collaboration system of claim 4, wherein the set of digital content is uploaded to the content management system and stored in the database server.

10. The digital collaboration system of claim 9, wherein the application server upon receiving the query, sends the query to the database server to retrieve the set of digital content.

11. The digital collaboration system of claim 4, wherein the user selections include, for each digital content item viewed on the client device, an indication of whether the digital content item is liked or disliked, and after user selections for all digital content items sent to the client device from the content management system are received, the collaboration application displays liked digital content, and the user is allowed to change any of the liked digital content to disliked before uploading user selected digital content to the content management system.

12. The digital collaboration system of claim 4, wherein the content management system generates reports based on user feedback received during the content selection stage and the group analysis stage.

13. The digital collaboration system of claim 4, wherein each of the digital content includes a title, a body of text and an image or video, and each digital content is tagged with a theme.

14. The digital collaboration system of claim 13, wherein each item in the set of digital content is a case study including digital content describing a particular subject.

15. A digital collaboration system facilitating a multi-stage collaborative event, the system comprising:
a content management system including:
an application server to:
create a collaboration event in an inactive state;
receive a query, including at least one tag associated with the collaboration event when the collaboration event is in the inactive state,
retrieve search results that include a set of digital content items satisfying the query during the inactive state from a database server that stores digital content,
add the set of digital content items to the collaboration event in the inactive state,
perform analytics on user feedback associated with displayed digital content by one or more users in a plurality of user groups to identify a pattern associated with an industry related to the collaboration event;
provide an insight, based on the identified pattern, regarding a particular case study from the displayed digital content;
change a status of the collaboration event from the inactive state to an active state to initiate a content selection stage upon either receiving an indication that an activate event button in a status area associated with the collaboration event has been clicked, or that the set of digital content items should be associated with the collaboration event, and
provide access to the set of digital content items to a plurality of client devices that are connected to the content management system via a network wherein each item in the set of digital content items is accessible by at least one of a plurality of client devices associated with at least one user in each of the plurality of user groups;
the database server that stores digital content items, including the set of digital content items for the collaboration event; and
a web server that generates a collaboration board in a graphical user interface in a browser on a group device and in one or more of the plurality of client devices;
a collaboration application executed by each of the plurality of client devices,
wherein, during the content selection stage of the collaboration event, each of the plurality of client devices receives a portion of the set of digital content items, and the collaboration application executed by each of the plurality of client devices displays the portion of the set of digital content items, receives user selections of the portion of the set of digital content items, and sends the user selections to the content management system, the user selections of the portions of the set of digital content items are provided by swiping a digital content item displayed on a display of a client device in a predetermined direction wherein swiping the digital content item in one direction indicates liking and includes an indication of selection of the digital content for a group analysis stage and swiping the digital content item in an opposite direction indicates dislike and stores an indication that the digital content item is not selected for the group analysis stage of the collaboration event; and
the group device is connected to the content management system via the web server, and during the group analysis stage of the collaboration event, the collaboration board
displays selected digital content,
receives and displays user feedback of the displayed selected digital content,
receives user-supplied categories of the displayed selected digital content, and
arranges the displayed selected digital content in the collaboration board.

16. The digital collaboration system of claim 15, wherein the application server:
determines a number of users in the collaboration event;
determines a number of the user groups;
determines a number of the users in each of the groups;
determines, for each user in each group, a corresponding portion of the set of digital content items to display to the user via the collaboration application executed by one of the plurality of client devices used by the user; and
during the content selection stage, sends the corresponding portion of digital content to the collaboration application via the network for review by the user.

17. The digital collaboration system of claim 16, wherein each content item in the portion of the set of digital content items is sent to at least one user in the user groups.

18. The digital collaboration system of claim 17, wherein the client device displays at least one of the subset of digital content items for the at least one user via the collaboration application executed by the client device, and the collaboration application allows the set of digital content items to be viewed by the user and receives selections from the set of digital content items for the at least one user.

19. The digital collaboration system of claim 15, wherein the collaboration application, via at least one of the plurality of client devices, enables creation of digital sticky-note labels that annotate one or more digital content items in the portion of the set of digital content items accessed by the client device.

20. The system of claim 15, wherein the content management system further is to:
provide insights regarding liking of particular case studies from the displayed content items by one or more users in the user groups.

\* \* \* \* \*